Figure 1:
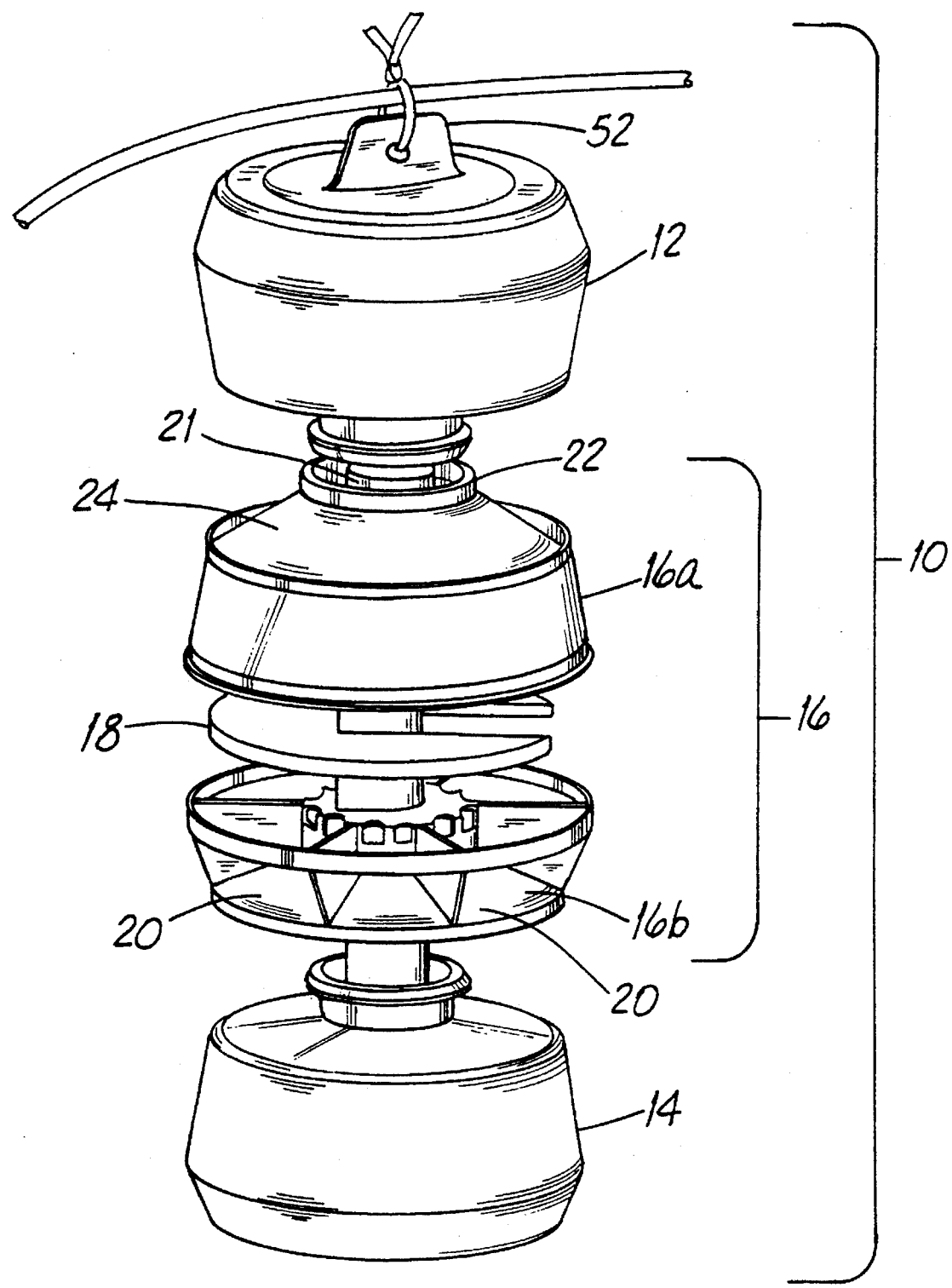
Figure 2:
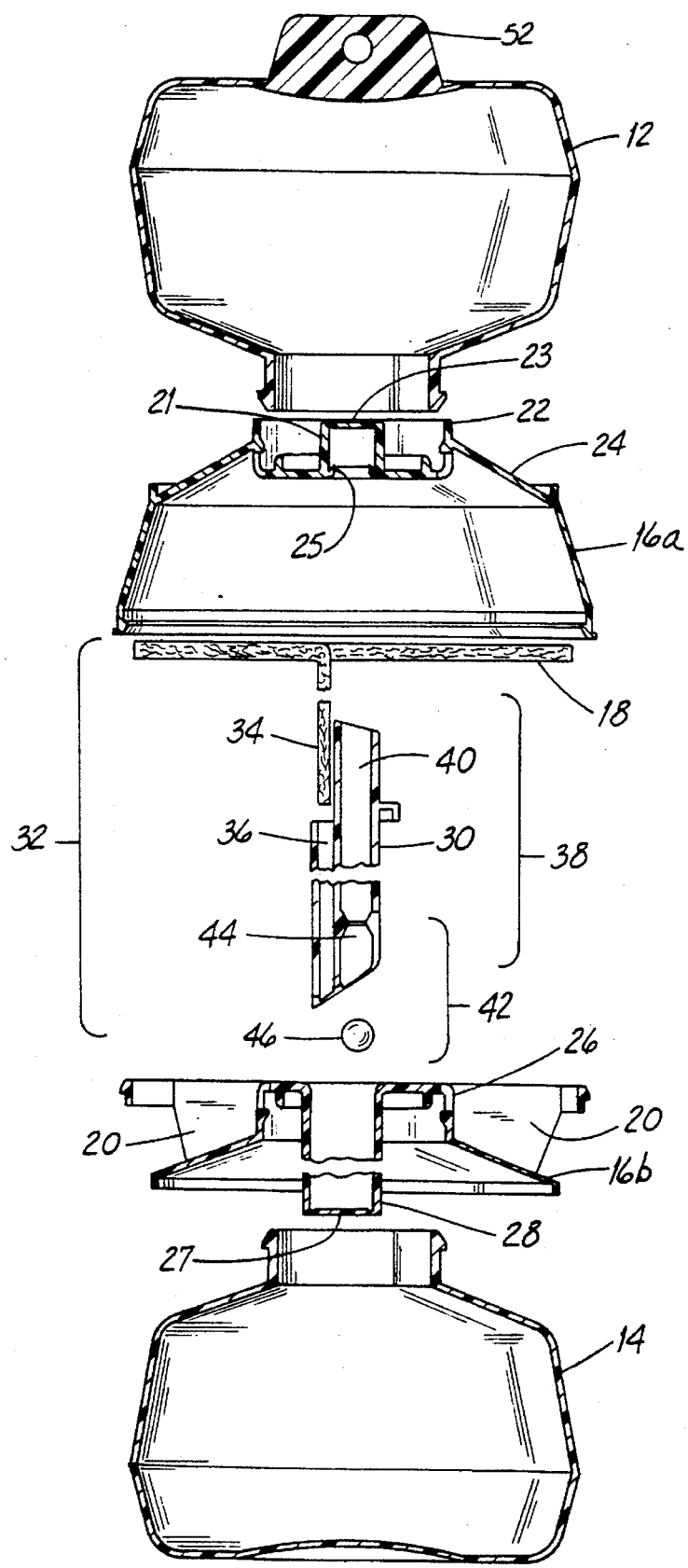

United States Patent
Wefler

Patent Number: 5,501,033
Date of Patent: Mar. 26, 1996

[54] TWO-STAGE LIQUID DELIVERY BAIT STATION

[75] Inventor: Mark E. Wefler, Mt. Pleasant, Wis.

[73] Assignee: S. C. Johnson & Son, Inc., Racine, Wis.

[21] Appl. No.: 236,926

[22] Filed: May 2, 1994

[51] Int. Cl.⁶ .................................................. A01M 1/20
[52] U.S. Cl. ............................................. 43/131; 43/132.1
[58] Field of Search ................................. 43/131, 132.1, 43/1, 129

[56] References Cited

U.S. PATENT DOCUMENTS

| | | |
|---|---|---|
| 511,689 | 12/1893 | Dodd . |
| 1,103,032 | 7/1914 | Childress . |
| 1,139,030 | 5/1915 | Goldhammer . |
| 1,916,982 | 7/1933 | Jones . |
| 2,606,391 | 8/1952 | McGrew ................................... 43/131 |
| 2,860,445 | 11/1955 | Yates . |
| 3,122,857 | 3/1964 | Yates . |
| 3,124,277 | 3/1964 | Helland . |
| 3,303,599 | 2/1967 | Ballard ....................................... 43/131 |
| 3,803,753 | 4/1974 | Feigin . |
| 4,179,840 | 12/1979 | Sandefur ................................... 43/131 |
| 4,473,968 | 10/1984 | Bean ......................................... 43/131 |
| 4,551,941 | 11/1985 | Schneidmiller . |
| 4,662,103 | 5/1987 | Cheng ....................................... 43/131 |
| 4,794,724 | 1/1989 | Peters . |
| 4,899,485 | 2/1990 | Schneidmiller . |
| 5,033,229 | 7/1991 | Demarest et al. . |
| 5,152,992 | 10/1992 | Kandathil et al. . |
| 5,263,274 | 11/1993 | Speed ........................................... 43/1 |

Primary Examiner—Maurina T. Rachuba
Assistant Examiner—Chuck Y. Mah

[57] ABSTRACT

A liquid delivery bait station having two reservoirs and two fluid transfer systems to allow for sequential delivery of two liquids. The liquids are preferably an insect bait-only formulation which is first delivered into an absorbent feeding pad and an insect bait-toxicant formulation which is next delivered to the absorbent pad. This sequential delivery allows flying insects such as yellowjackets to be trained to the station by the bait formulation before they are exposed to the bait-toxicant formulations.

14 Claims, 3 Drawing Sheets

5,501,033

TWO-STAGE LIQUID DELIVERY BAIT STATION

TECHNICAL FIELD

This invention relates to the field of insect control and particularly to a liquid bait-toxicant delivery station having two separate reservoirs with an access/feeding portion located between the two reservoirs. When the station is activated liquids are sequentially delivered from the two reservoirs. First the lower reservoir, which is filled with a bait-only solution, and then the upper reservoir, which is filled with a bait-toxicant solution, wick into a fibrous feeding pad in the access/feeding portion.

BACKGROUND OF THE INVENTION

There are three main types of non-electrical insect control devices or methods: entrapment, contact poison, or ingested poison. Entrapment helps control a current population of insects in a location, as do either contact or ingested poisons of the "quick kill" variety. Complete destruction of a source of insects can only be achieved by the use of a "delayed-kill" toxicant which aggregating insects will carry back to their home colony.

The use of such a "delayed kill" bait-toxicant formulation for the eradication of colonies of wasps is disclosed by and discussed in U.S. Pat. No. 5,152,992 to Kandathil et al., "Method for Control of Social Insects with a Hemisalt of a Perfluroalkane Sulfonic Acid". The bait-toxicant formulation disclosed by this patent is a concentration dependent toxicant formulation. The toxicant level is kept low enough so that foraging wasps are not immediately killed by the amount of toxicant, so they are able to carry portions of the formulation back to their home colony and share it with wasps inside the colony. As the wasps ingest more of the formulation, the toxicant level builds up to lethal levels. Ultimately, the whole colony is destroyed.

One problem with insect control methods involving toxicants that must be ingested is that the toxicant must be eaten by the target insect. For this reason, toxicants are almost always blended with a bait which is attractive to the target insect. While this may sound simple and fundamental, many parameters must be balanced to provide an effective bait-toxicant formulation, and differences in feeding preferences and sensitivities in different species of target insects.

Roaches may be described as feeding "source generalists." They will eat almost anything unless the food source has too high an adulterant level of toxicant, surfactant, or other substance that makes them consider the food not palatable. Thus, getting roaches to eat the bait-toxicant formulation does not present much of a problem.

When the target insect is a wasp, however, there is a problem. Wasps are also feeding source generalists, but are quite sensitive to the presence of adulterants in the food. A palatable bait toxicant formulation, carefully prepared so that the levels of toxicants and surfactants are kept low enough that the wasps would ingest the formulation was disclosed in U.S. Pat. No. 5,152,992. Such a formulation could be dispersed by any type of liquid dispersing station.

Devices that allow liquid to travel up a wick from a reservoir are well known, and range from kerosene lamps to the old AIRWICK air fresheners. An example of the use of a wicking mechanism used in an insect control device is disclosed by U.S. Pat. No. 1,916,982 to Jones, "Fly Destroyer." A fly poison mixed with sugar is placed in contact with an absorbent pad which extends into a sealable liquid reservoir. The user fills the reservoir with water, which wets the pad, and flies landing on the device are then offered a poisoned sugar solution.

Devices that allow liquid to be dispensed downwardly from a tube extending from a reservoir are also well known and can be seen attached to the rodent cages in any pet store. One device that allows the controlled gravity feed dispensing of a toxic liquid is disclosed by U.S. Pat. No. 2,860,445 to Yates, "Rodent Exterminating Device" discloses a dispensing apparatus having a liquid container which gravity feeds into a feed pipe. When the liquid reaches a predetermined level in a liquid well beneath the container, a floating ball check valve closes off the feed pipe and prevents further flow.

One entrapment type trap which the user must activate by adding the bait lure as well as water to drown the attracted yellowjackets, marketed as the "Deluxe Surefire Yellowjacket Wasp Trap" is manufactured by Consep Membranes Inc.

A liquid bait station intended to be used for the control of crawling insects such as roaches having a single reservoir portion which fits within a base structure is disclosed by U.S. Pat. No. 5,033,229 to Demarest et al. A liquid bait-toxicant formulation is released from the reservoir onto and moistens an absorbent pad. Insects can, through peripheral openings in the base structure, access the bait-toxicant soaked pad, feed therefrom, and, ultimately die.

U.S. Pat. No. 5,152,992, discussed earlier, discloses the use of a generic reservoir with a wicking mechanism from which wasps or other flying insects may feed to ingest a delayed-action bait-toxicant solution which has been formulated to be palatable to the wasps.

An approach to getting yellowjackets to ingest a toxicant that has been found very effective might be called "bait and switch." If the yellowjackets have been allowed to become accustomed to a liquid food source containing no toxicants (a bait-only formulation), they are more likely to continue feeding from the source after a toxicant is added to the formulations. For such a method to be convenient and effective, a specialized delivery system needs to be employed.

BRIEF SUMMARY OF THE INVENTION

The present invention provides an unique two-stage liquid bait-toxicant delivery station intended for the control of flying insects, especially wasps.

The station has three main components which are joined by a fluid transfer system. An upper reservoir has a neck opening and a hanging tab; a lower reservoir has a neck opening. An access/feeding station, containing an absorbent fibrous feeding pad with which the fluid transfer system connects, is located between the two reservoirs. The station has a non-activated position, in which liquid is contained within the upper and the lower liquid reservoirs and an activated position in which liquid contained within the upper and lower reservoirs can flow out of those reservoirs, pass into fluid transfer systems which transfer liquid from the reservoir onto the feeding pad.

The lower reservoir is filled with a non-toxic bait formulation, while the upper reservoir is filled with a toxic bait formulation.

Inserted into the liquid in the lower reservoir when the bait station is activated is a fibrous wick which is attached to and forms part of the absorbent feeding pad. Liquid from the lower reservoir thus moves upward by capillary action and impregnates the feeding pad.

When the lower reservoir substantially empties, the upper reservoir is allowed to vent, causing the flow of toxicant formulation down through a fluid transfer tube into the lower reservoir from where it is wicked up into the absorbent feeding pad. A ball check valve within the lower end of the fluid transfer tube prevents toxicant in the upper reservoir from migrating into the lower reservoir, since two liquids in contact with each other will seek a state of equilibrium.

BRIEF DESCRIPTION OF THE DRAWINGS

FIG. 1 is an exploded perspective view of the bait station.

FIG. 2 is an exploded side-sectional view of the bait station.

FIG. 3 is a side-sectional view of the bait station in its pre-activation position showing the liquid within the containers.

FIG. 4 is a side-sectional view of the bait station in its activated position showing liquid within the containers.

Best Mode for Carrying Out the Invention

In the detailed description of the drawings of the best mode for carrying out the invention, like reference numbers are used on the different figures to refer to like parts. Parts or features that are functionally similar but differ slightly in structure and/or location, or are subassemblies of a part are indicated by reference numbers followed by lower case letters.

As FIG. 1 shows, two stage liquid delivery bait station 10 has three main sub-assemblies: upper liquid reservoir 12, lower liquid reservoir 14, and located between the two, access and feeding portion 16. The fluid transfer system, described below, extends into both lower liquid reservoir 14 and upper liquid reservoir 12 and, when the bait station is in its activated position, allows liquid from both containers to sequentially reach and impregnate absorbent feeding pad 18. A series of access ports 20 allow insects to reach and feed from absorbent feeding pad 18. Absorbent feeding pad 18 is preferably made of a cellulose material.

As is best shown in FIGS. 3 and 4, access and feeding portion 16 is itself made up of a housing comprised of upper access portion **16*a* and lower access portion 16*b*. Upper access portion housing 16*a* has central upper connection area 22 having located, in its center, upper neck opening structure 21, which is sealed with upper neck seal 23**.

Also located within and an integral portion of the upper neck opening structure 21, is fluid transfer housing seal 25 (shown in FIG. 2 but not indicated on FIGS. 3 and 4) which forms a liquid tight seal around fluid transfer housing 30. This prevents the upper reservoir from venting except through fluid transfer tube 40.

The upper housing access portion **16*a*** serves to surround and protect absorbent feeding pad from exposure to rain and sunlight and thus limits dilution, evaporation and crystallization of the liquid bait-toxicant formulation which are delivered by the station.

Surrounding upper reservoir connection area 22 is, integrally formed with upper access portion **16*a*, conical flexible support member 24 which is intended to be inverted or "oil canned" inside the upper portion of 16*a* when liquid delivery bait station 10** is placed in the activated position, as described below.

Lower access portion **16*b* has central lower connection area 26, having located, in its center, lower neck opening structure 28 which extends almost to the base of lower liquid reservoir 14. Lower neck opening structure 28 is sealed with lower neck seal 27**.

Within fluid transfer housing 30, which is positioned between and within upper neck opening structure 21 and lower neck opening structure 28, is the fluids transfer system of liquid delivery station 10, which is composed of two distinct but joined fluid transfer systems, 32 and 38.

Fluid transfer system 32 is a wicking system that transfers liquid upward by capillary action. Integrally formed with and extending downwardly from absorbent feeding pad 18 is wick 34, which lies within fluid transfer channel 36. When liquid delivery station 10 is activated, as described below, fluid transfer channel 36 and wick 34 extend into the liquid within lower liquid reservoir 14.

Fluid transfer system 38 is made up of fluid transfer tube 40 which is open at its upper end and has located within its lower end, ball-check assembly 42. Ball check assembly 42 is made up of ball seat 44 against which ball 46 presses upwardly to seat. Formed into one side of the lower end of fluid transfer tube 40 and extending up through ball seat 44 is a vent slot (not shown).

When liquid delivery station 10 is activated and inverted, liquid from both upper liquid reservoir 12 and lower liquid reservoir 14 enters and fills fluid transfer tube 40. Ball 46 floats within fluid transfer tube 40 on the liquid within lower liquid reservoir 14 and presses against ball seat 44.

Liquid within lower liquid reservoir 14 travels up wick 34 and into absorbent feeding pad 18 as shown by the solid arrows in FIG. 4. Liquid is removed from absorbent feeding pad 18 as it is ingested by insects and by evaporation. As the liquid level within lower liquid reservoir 14 drops, ball 46 also drops until it no longer seats against ball seat 44. Simultaneously, the vent slot in the lower end of fluid transfer tube 40 is exposed to ambient atmospheric pressure. The vent slot prevents a vacuum in the upper reservoir from holding ball 46 against ball seat 44 when the liquid level within lower liquid reservoir 14 drops and upper liquid reservoir 12 can vent allowing the toxicant-bait formulation to flow down into lower liquid reservoir 14. As liquid flows from upper liquid reservoir 12 into lower liquid reservoir 14, the liquid level rises until ball 46 is reseated against ball seat 44. This prevents further liquid flow, until the cycle repeats until liquid reservoir 12 is emptied.

Lower liquid reservoir 14 is vented to the atmosphere through fluid transfer channel 36, and through lower neck opening structure 28, so the interior of lower liquid reservoir 14 is always at ambient atmospheric pressure. When the vent slot of fluid transfer tube 40 is uncovered by the drop in the liquid level, air can enter fluid transfer tube 40 and from there enter upper liquid reservoir 12. As this happens, liquid leaves upper liquid reservoir 12 and flows through fluid transfer tube 40, around ball 46 and into lower liquid reservoir 14, as shown by the dotted arrows in FIG. 4. From there, the liquid follows the route indicated by the solid arrows, up wick 34 and into absorbent feeding pad 18.

In order to prepare two-stage liquid bait-toxicant delivery station 10 for use, lower liquid reservoir 14 is, by the manufacturer or assembler of bait delivery station 10, filled with liquid bait formulation 48, attractive to the target flying insects. The bait formulation used when yellowjackets are the target insect would preferably be a formulation of sucrose or fructose in water, although the addition of protein would also be desirable especially at certain points in the growth and reproduction cycles of the yellowjackets.

Lower reservoir neck opening 28 would be sealed with an integrally molded puncturable neck seal 27.

Similarly, upper liquid reservoir 12 will be filled with toxicant-bait formulation 50 and upper reservoir neck opening structure 21 sealed with upper neck seal 23 which would preferably be made of foil or similar puncturable sealing means. Toxicant-bait formulation 50 may be a concentration dependent toxicant preparation such as that described in U.S. Pat. No. 5,152,992.

The advantage of such a toxicant, as discussed in that patent, is that the level of toxicant in the bait-toxicant formulation can be set at a level which is beneath the lethal level that would produce a "quick kill". The low level of toxicant produces a delayed kill action. Individual insects only die when they have ingested enough toxicant for the concentration of toxicant in their bodies to rise to the lethal level. The fact that individual insects do not die after a single feeding from a bait-toxicant formulation means that social insects such as wasps carry the poisoned food back to their home nest and share it with others in the nest (a process called trophallaxis). The fact that the formulation is liquid makes the carrying and sharing easier. As multiple small doses of toxicant are shared, the level of toxicant builds. Eventually this method can eradicate an entire nest. The location of the home nest does not need to be known as it would if direct contact poisoning were to be used. This is an obvious advantage.

Figure 3:
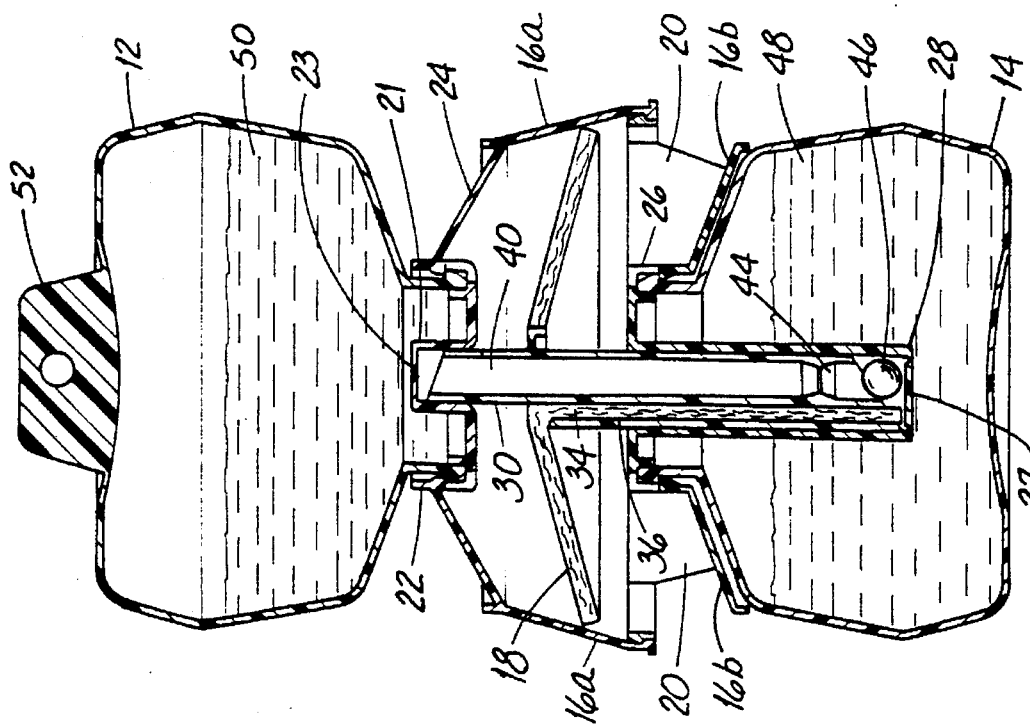

After bait station 10 has been filled with bait and bait toxicant solutions and assembled in its preactivated configuration (best shown by FIG. 3), it would then pass into the hands of the user. The user would activate bait station 10 by inverting bait station 10 and positioning "upper" liquid reservoir 12 upon a rigid surface such as a table, and pressing down on "lower" liquid reservoir 14. This hand pressure would cause conic flexible support member 24 to invert in a non-reversible fashion, allowing upper liquid reservoir 12 to move in an axial direction toward lower liquid reservoir 14, thus reducing the distance between both reservoirs.

Figure 4:
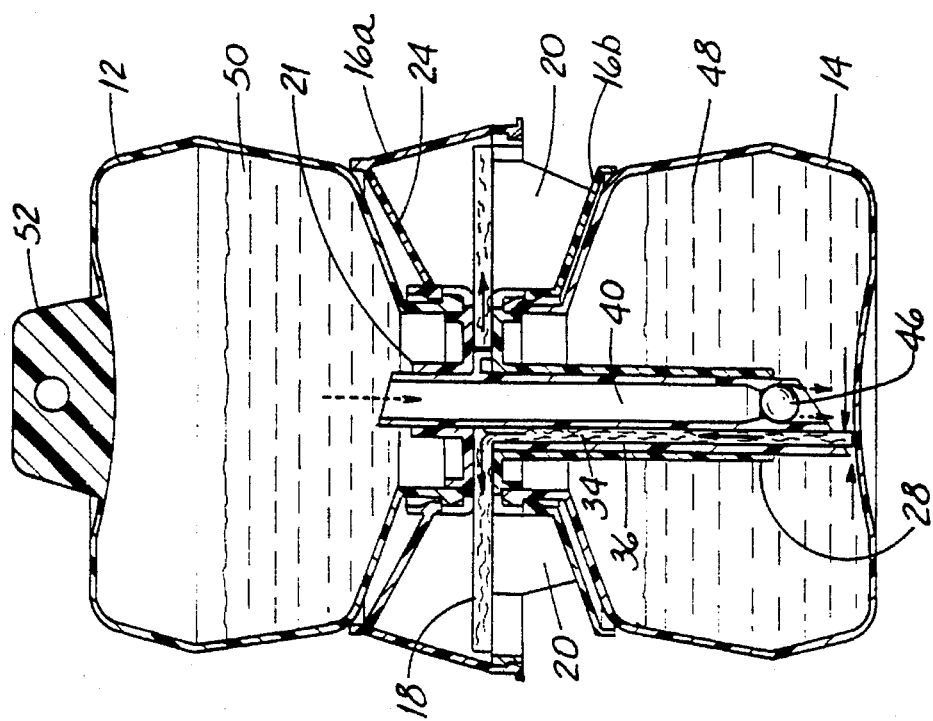

Simultaneously, fluid transfer housing 30 pierces, with its upper end, upper neck seal 23 and with its lower end pierces lower neck seal 27. This places bait station 10 in its activated configuration (best shown by FIG. 4). The user then inverts bait station 10, unfolds and erects hang tab 52, and, hangs bait station 10 (by means of hang tab 52) in a location known to be frequented by yellowjackets (the preferred target insect). Obviously, both reservoirs of the delivery station of the present invention could be filled with the same formulation, either bait only or bait toxicant. In such a case, the two-reservoir system would provide a convenient delivery system with doubled capacity. However, the uniqueness of the two-stage fluid delivery system is best utilized when, as described before, the lower reservoir is filled with a bait-only formulation, and the top reservoir is filled with a bait-toxicant formulation. When this system is used, yellowjackets can be trained to return to the location of a food (bait) source. Once they have been so trained, they more readily feed from a bait-toxicant formulation in the same location. This feeding behavior has been tested in the field.

As reported in U.S. Pat. No. 5,152,992, field testing showed that yellowjackets tend to return to known sources of food. Several wicking type stations containing only aqueous bait formulations (no toxicant) were placed near areas known to be frequented by yellowjackets. Yellowjackets visiting a station were netted and marked with a drop of paint. Different colors were used to identify the different stations. No Yellowjackets marked at one station were later found at a different station, proving that the yellowjackets did in fact become trained to return to and feed from the one station that they had first encountered.

No Pre-Training

Three stations with toxic bait were placed out at each of two sites known to have a yellowjacket (*Vespula germanica*) nest nearby. Three stations with a nontoxic bait-only formulation were placed out at each of two other sites to serve as controls. Stations were placed out as soon as a site was found, so not all sites were measured at the earliest dates.

TABLE I

Nest activity (number of exits per 5 minutes) of yellowjackets at sites given control and toxicant bait without pretraining.

| | Toxicant | | No Treatment | |
|---|---|---|---|---|
| Date | Site 1 | Site 2 | Site 3 | Site 4 |
| 9/3/92 | 66 | — | — | — |
| 9/4/92 | 99 | 5 | 95 | — |
| 9/5/92 | 118 | 51 | 15 | — |
| 9/6/92 | 101 | 53 | 108 | 80 |
| 9/7/92 | 112 | 78 | 160 | 92 |
| 9/8/92 | 80 | 43 | 152 | 53 |
| 9/10/92 | 36 | 20 | — | 18 |

The pattern of activity was the same for both treatment and control. This suggests that simply placing out bait stations with toxicant was not effective at delivering toxicant back to the nest under the conditions of this test. (The drop in activity in all nests on Sept. 10, 1992 was due to weather.)

With Pre-training

Three stations with the bait-only formulation were placed out at each of seven sites known to have a yellowjacket nest nearby. After training yellowjackets to the stations for several days, the bait stations were replaced with new stations containing toxicant bait at three sites and containing the bait-only formulation at four sites.

TABLE 2

Mean nest activity (exits per 5 minutes) of *Vespula germanica* given control bait and toxicant bait.

| Date | Control | Toxicant |
|---|---|---|
| Pretraining baits placed | | |
| 9/18/92 | 76.3 | 117.0 |
| 9/19/92 | 46.3 | 83.7 |
| 9/20/92 | 69.3 | 104.7 |
| 9/21/92 | 76.0 | 98.5 |
| 9/22/92 a.m. | 75.6 | 92.8 |
| Treatment placed | | |
| 9/22/92 p.m. | 118.5 | 39.3 |
| 9/23/92 | 101.0 | 18.2 |
| 9/24/92 | 92.3 | 10.7 |
| 9/25/92 | 94.6 | 17.2 |

During the training period, yellowjacket nest activity was high at all sites. After toxicant was placed out, nest activity dropped very quickly to a low level, indicating that most workers in the nest had been killed. Control activity remained high. Thus, pre-training before placing out toxic baits was very effective.

The testing described above was, as stated, done by filling the stations with the different formulations. The present invention provides a way of having the change over performed automatically and with no need for an end-user to have any physical contact with either the bait-only or the bait-toxicant formulations.

Other modifications of the two-stage liquid bait toxicant delivery station of the present invention will become apparent to those skilled in the art from an examination of the above patent specification and drawings. Therefore, other variations of the present invention may be made which fall within the scope of the following claims, even though such variations were not specifically discussed above.

INDUSTRIAL APPLICABILITY

The two stage liquid delivery bait toxicant station of the present invention can be used to reduce and even eliminate populations of nuisance insects such as yellowjackets. Although yellowjackets frequent places where garbage has been placed, they are only a nuisance in places where there are both humans and food sources.

Thus, any outdoor area where people eat, whether it be the outdoor area of a restaurant, a public picnic area, a home patio, or a park, zoo or locations where recreation activities or sports events take place, where people may walk or sit carrying food are all locations where the control and elimination of yellowjackets is desirable.

What I claim is:

1. A two-stage liquid bait-toxicant delivery station for the control of insects, the delivery station being capable of transforming from a preactivated configuration to an activated configuration and comprising:

a. a lower liquid reservoir for containing a first liquid;
   b. an upper liquid reservoir for containing a second liquid;
   c. an insect access and feeding portion located between the upper and lower liquid reservoirs, the insect access and feeding portion having an absorbent feeding pad located therein and insect access ports which allow insects to reach the absorbent feeding pad;
   d. a fluid transfer system that does not communicate with the liquid reservoirs when the delivery station is in its pre-activated configuration but that, when the delivery station is in its activated configuration, connects the upper liquid reservoir and the lower liquid reservoir with the insect access and feeding portion to allow liquid within the upper and the lower liquid reservoirs to reach the insect access and feeding portion upon activation of the delivery station; and
   e. flow controlling means for controlling the flow into the fluid transfer system of the second liquid from the upper liquid reservoir so that initially the first liquid and subsequently the second liquid are delivered to the absorbent feeding pad, to sequentially expose the first and second liquids to insects feeding from the absorbent feeding pad.

2. The delivery station of claim 1 wherein
   a. the upper and lower reservoirs each have a neck opening, and a seal closes each neck opening;
   b. the fluid transfer system includes a first fluid transfer system that delivers the first liquid to the absorbent feeding pad and a second fluid transfer system that delivers the second liquid to the lower liquid reservoir to mix with any remaining portion of the first liquid and be delivered from the lower reservoir to the absorbent feeding pad by the first fluid transfer system; and
   c. the delivery station further comprises a transfer structure that contains the first and second fluid transfer systems and is adapted to penetrate the seals closing the neck openings of the upper and lower liquid reservoirs when the delivery station is put into its activated configuration to make the first and second fluids accessible to the fluid transfer systems.

3. The delivery station of claim 2 wherein
   a. the first fluid transfer system includes a wick that is integrally formed with the absorbent pad, the wick extending, when the delivery station is in its activated configuration, through the fluid transfer structure and into the lower fluid reservoir; and
   b. the second fluid transfer system includes a fluid transfer tube having a lower tube end and an upper tube end that, when the delivery station is put into its activated configuration, are respectively thrust through the seals that close the lower and upper liquid reservoir neck openings to extend into the lower and upper reservoirs, the upper tube end then being in open communication with the liquid in the upper liquid reservoir while the lower tube end is in communication with said flow controlling means, said flow controlling means including a floating ball check assembly that closes the lower tube end when the level of liquid in the lower liquid reservoir is at or above a selected level, to control the passage of liquid from the upper to the lower liquid reservoirs.

4. The delivery station of claim 2 wherein the insect access and feeding portion includes a conical, flexible support member that extends upwardly when the delivery station is in its pre-activated configuration and that inverts to extend downwardly when the delivery station is put into its activated configuration to allow the upper liquid reservoir to move in an axial direction toward the lower liquid reservoir to cause the fluid transfer structure to pierce the seals closing the neck openings of the liquid reservoirs, providing for liquid transfer from the lower liquid reservoir to the absorbent feeding pad and from the upper liquid reservoir to the lower liquid reservoir.

5. The delivery station of claim 1 wherein the first liquid is a formulation substantially free of insect-toxic substances and contains a bait that is attractive to insects, and the second liquid is a formulation containing both the bait and a substance toxic to insects.

6. The delivery station of claim 5 wherein the second liquid contains a concentration-dependent toxicant formulation.

7. A method for controlling populations of insects comprising the steps of:
   a. providing a two-stage liquid bait-toxicant delivery station made in accordance with claim 1, wherein the second liquid contains an insect-toxic substance;
   b. putting the delivery station into its activated configuration; and
   c. exposing the delivery station to the insects to be controlled.

8. The method for controlling a population of insects of claim 7 wherein
   a. the upper and lower reservoirs of the delivery station each have a neck opening, and a seal closes each neck opening;
   b. the fluid transfer system includes a first fluid transfer system that delivers the first liquid to the absorbent feeding pad and a second fluid transfer system that delivers the second liquid to the lower liquid reservoir to mix with any remaining portion of the first liquid and be delivered from the lower reservoir to the absorbent feeding pad by the first fluid transfer system; and c. the delivery station further includes a transfer structure that contains the first and second fluid transfer systems and is adapted to penetrate the seals closing the neck openings of the upper and lower liquid reservoirs when the delivery station is put into its activated configuration to make the first and second fluids accessible to the fluid transfer systems.

9. The method for controlling a population of insects of claim 8 wherein a. the first fluid transfer system includes a wick that is integrally formed with the absorbent pad, the wick extending, when the delivery station is in its activated configuration, through the fluid transfer structure and into the lower fluid reservoir; and p1 b. the second fluid transfer system includes a fluid transfer tube having a lower tube end and an upper tube end that, when the delivery station is put into its activated configuration, are respectively thrust through the seals that close the lower and upper liquid reservoir neck openings to extend into the lower and upper reservoirs, the upper tube end then being in open communication with the liquid in the upper liquid reservoir while the lower tube end is in communication with said flow controlling means, said flow controlling means including a floating ball check assembly that closes the lower tube end when the level of liquid in the lower liquid reservoir is at or above a selected level, to control the passage of liquid from the upper to the lower liquid reservoirs.

10. The method for controlling a population of insects of claim 8 wherein a. the insect access and feeding portion includes a conical, flexible support member that extends upwardly when the delivery station is in its pre-activated configuration and that inverts to extend downwardly when the delivery station is put into its activated configuration to allow the upper liquid reservoir to move in an axial direction toward the lower liquid reservoir to cause the fluid transfer structure to pierce the seals closing the neck openings of the liquid reservoirs, providing for liquid transfer from the lower liquid reservoir to the absorbent feeding pad and from the upper liquid reservoir to the lower liquid reservoir; and b. the step of putting the delivery station into its activated configuration includes thrusting the upper liquid reservoir and lower liquid reservoir toward each other to invert the conical, flexible support member and cause the fluid transfer structure to pierce the seals closing the neck openings of the liquid reservoirs.

11. The method for controlling a population of insects of claim 7 wherein the first liquid is a formulation substantially free of insect-toxic substances and contains a bait that is attractive to insects, and the second liquid is a formulation containing both the bait and a substance toxic to insects.

12. The method for controlling a population of insects of claim 7 wherein the toxicant-containing formulation is a concentration-dependent toxicant formulation.

13. The method for controlling a population of insects of claim 7 wherein the insects are flying insects.

14. The method for controlling a population of insects of claim 7 where the insects are wasps.

* * * * *